United States Patent [19]

Dupuy

[11] Patent Number: 5,249,548
[45] Date of Patent: Oct. 5, 1993

[54] SHELLFISH DEPURATION SYSTEM

[75] Inventor: John L. Dupuy, Germantown, Md.

[73] Assignee: Chi & Associates, Inc., Arlington, Va.

[21] Appl. No.: 855,778

[22] Filed: Mar. 23, 1992

[51] Int. Cl.$^5$ .............................................. A01K 63/04
[52] U.S. Cl. .................................................... 119/243
[58] Field of Search ................................. 119/2, 3, 4, 5

[56] References Cited

U.S. PATENT DOCUMENTS

| | | | |
|---|---|---|---|
| 2,871,820 | 2/1959 | Hayden | 119/5 |
| 3,418,138 | 12/1968 | Dennis et al. | 99/158 |
| 3,641,982 | 2/1972 | Woodridge et al. | 119/4 |
| 3,870,019 | 3/1975 | McNichol | 119/4 |
| 3,888,210 | 6/1975 | Buss | 119/3 |
| 3,981,273 | 9/1976 | Buss | 119/3 |
| 4,137,868 | 2/1979 | Pryor | 119/2 |
| 4,141,318 | 2/1979 | MacVane et al. | 119/3 |
| 4,213,421 | 7/1980 | Droese et al. | 119/3 |
| 4,368,691 | 1/1983 | Brune | 119/2 |
| 4,537,149 | 8/1985 | Ryan | 119/4 |
| 4,653,429 | 3/1987 | Murphy | 119/4 |

FOREIGN PATENT DOCUMENTS

| | | | |
|---|---|---|---|
| 73528 | 6/1981 | Japan | 119/3 |
| 2028621 | 3/1980 | United Kingdom | 119/2 |

*Primary Examiner*—John G. Weiss
*Attorney, Agent, or Firm*—Watson, Cole, Grindle & Watson

[57] ABSTRACT

A tank for the depuration of shellfish incorporating an elongated open vessel for retaining sea water and a manifold extending the length of the bottom of the vessel substantially along the longitudinal center axis from one end of the vessel to the other and including a connection at each end thereof for the injection of sea water with a plurality of fill pipes extending from the manifold toward each side of the vessel and each fill pipe including a pattern of holes for the emission of sea water therefrom forming an up-welling pattern to provide a desired turbulence within the vessel and a trough extending around the upper periphery of the vessel for recovering sea water spilling over the upper walls of the vessel such that the injection of sea water through the holes and the recovery of the sea water in the troughs preventing dead spots within the sea water in the vessel.

17 Claims, 4 Drawing Sheets

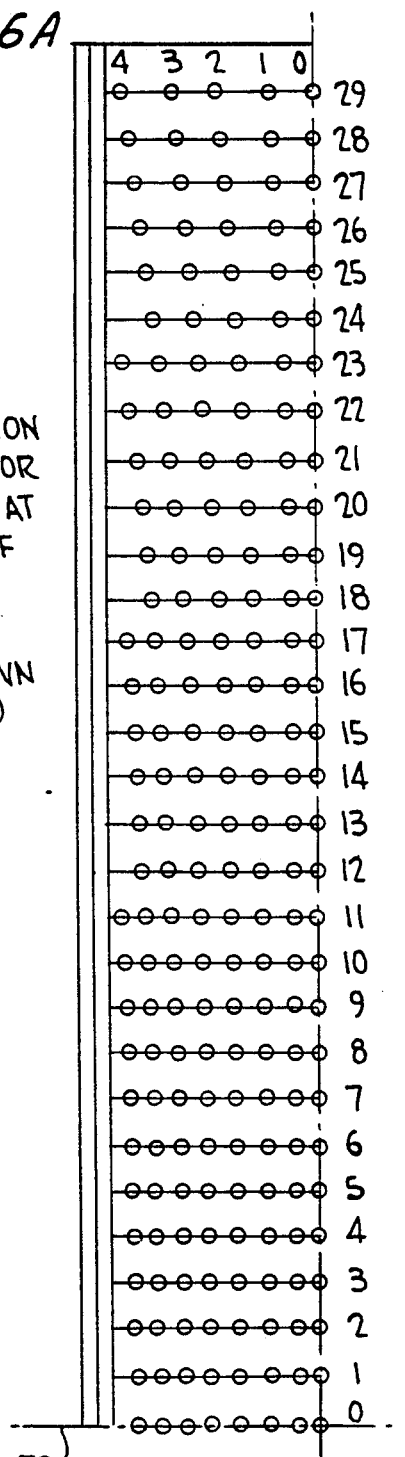
FIG. 6A — PERFORATION PATTERN FOR MANIFOLD AT BOTTOM OF TANK — QUARTER TANK SHOWN (TYPICAL)
FIG. 6B — DISTANCE OF PERFORATION MEASURED FROM ₵ (INCHES)

SHELLFISH DEPURATION SYSTEM

BACKGROUND OF THE INVENTION

1. Field of the Invention

This invention is directed to method and apparatus for the depuration of shellfish, and more particularly to such depuration of oysters using a novel tank configuration, closed cycle water flow and purification system in conjunction with the bacteriological testing of the shellfish and the water to determine the level of total coliform, fecal coliform, Vibrio Vulnificus and Vibrio parahaemolyticus for monitoring the purification process.

2. Related Art

The depuration of shellfish, and particularly oysters, has been attempted for some time, but historically such depuration attempts have not been commercially successful, especially on a large commercial scale, primarily because of the lack of engineering in the design of the depuration system coupled with the lack of integration with the biological requirements of the oysters to induce self-purging.

The major problems encountered with both small and large depuration units have been the presence of dead spots in the water column in the tank, the inadequate sterilization of the sea water, and the failure to provide an environment conducive to the self-purging of the oysters. Additionally, the costs of depurating oysters on a small scale have caused investors to hesitate from investing in new projects that would meet the demands of producers, brokers and retailers.

U.S. Pat. No. 4,537,149 entitled "Method and Apparatus for Cleaning Tainted Shellfish", disclosed a depuration tank having a bottom grid of pipes for cleaning the tank.

U.S. Pat. No. 3,641,982 entitled "Bivalvia Depuration System", provides tank input pipes for spraying water across the top of the tank and at two levels beneath the top of the water to keep water moving rapidly in the tank.

U.S. Pat. No. 3,888,210 entitled "Fish Husbandry System Utilizing at Least Partial Recirculation of Water", discloses a fish rearing tank having an overflow trough.

U.S. Pat. No. 3,870,019 entitled "Oyster Culture Basket", discloses the flow of water outwardly through holes in standpipes.

U.S. Pat. No. 3,418,138 entitled "Apparatus for and Methods of Treating Bivalves", provides circulation of water in the tank via a conduit at one end of the tank and uses a pipe with holes for dripping water into the other end of the tank and rotary pumps for circulating the water.

U.S. Pat. No. 4,653,429 entitled "Process and Apparatus for Preparation of Bivalves for Human Consumption", shows water injected into a tank via peripherally located injection nozzles and is drained by drains at the bottom of the tank.

SUMMARY OF THE INVENTION

At present it is not believed that there exist any large depuration systems (for example, at least 30,000 oysters per depuration cycle) meeting the requirements of the various State Health Departments and the Food and Drug Administration, and which will provide consistent, efficient production of oysters at a reasonable cost. Thus, it is a primary object of the method and apparatus of the present invention to supply a modular system that will meet the depuration requirements of state and federal guidelines, producing at least 150 bushels (34,500) per 48 hr. depuration cycle. Higher production goals can simply be achieved by increasing the number of modular depuration units.

The depuration method and apparatus of the present invention has three major design concepts producing optimal results, namely: (1) elimination of dead spots within the circulation of water in the tank; (2) optimization of the biological and physical parameters which encourage all oysters to pump and purge themselves efficiently; and (3) the filtration and sterilization of water the oysters use for their purification or depuration.

The above enumerated design concepts are achieved by the injection of water at both ends along the bottom of the tank evenly and exiting along the entire periphery of the tank. This allows salt water to travel a maximum of six feet from entrance to exit in the depuration tank during operations. This salt water is collected, after overflowing on both sides of the top of the tank, and sent via pipes and recycled through a diatomaceous earth filter (DEF) and an ultraviolet sterilizer before being returned via a pump to the tank.

Significant features of the depuration method and apparatus of the invention involve the length-to-width ratio of the modular tank, the overflow of the tank water around the entire periphery of the tank and the hole pattern and size of holes in the fill pipes for injecting water into the tank.

The general objects of the method and structure of the depuration method and apparatus of the invention are to prevent dead spots in the flow of sea water in the depuration tank thereby eliminating sources of additional potential pollution growth. The location, pattern of holes in the fill pipes, the size of the holes and the sea water flow rate all combine to create the optimum turbulence that induces oysters to pump and thereby self-purge.

An additional feature of the invention is to provide a modular depuration tank and the components associated therewith that are made of ceramic or gel-coated materials to prevent the release of toxic materials into the sea-water and the depuration tank.

The above description pertains to the structure and function of the purification system. The bacterial analysis portion of the depuration process involves two distinct groups of bacteria, namely, (1) those associated with the fecal coliforms or sewage and runoff pollution and (2) those bacteria which reside in the marine environment as part of the natural microbial population, regardless of general pollution or point source pollution.

The sampling procedure involves taking samples of the shellfish from the depuration tank at specified intervals of time from the beginning to the end of the depuration process. The samples of shellfish are then subjected to bacteriological tests as indicated above.

BRIEF DESCRIPTION OF THE DRAWINGS

FIG. 6a is a plan view of a half section of one-half of the depuration tank showing the placement of the holes in the filling pipes connected to the manifold; and FIG. 6b is a chart showing the displacement of each of the holes in the filling pipes from the center line of the depuration tank.

DETAILED DESCRIPTION OF THE DEPURATION SYSTEM

Figure 1:
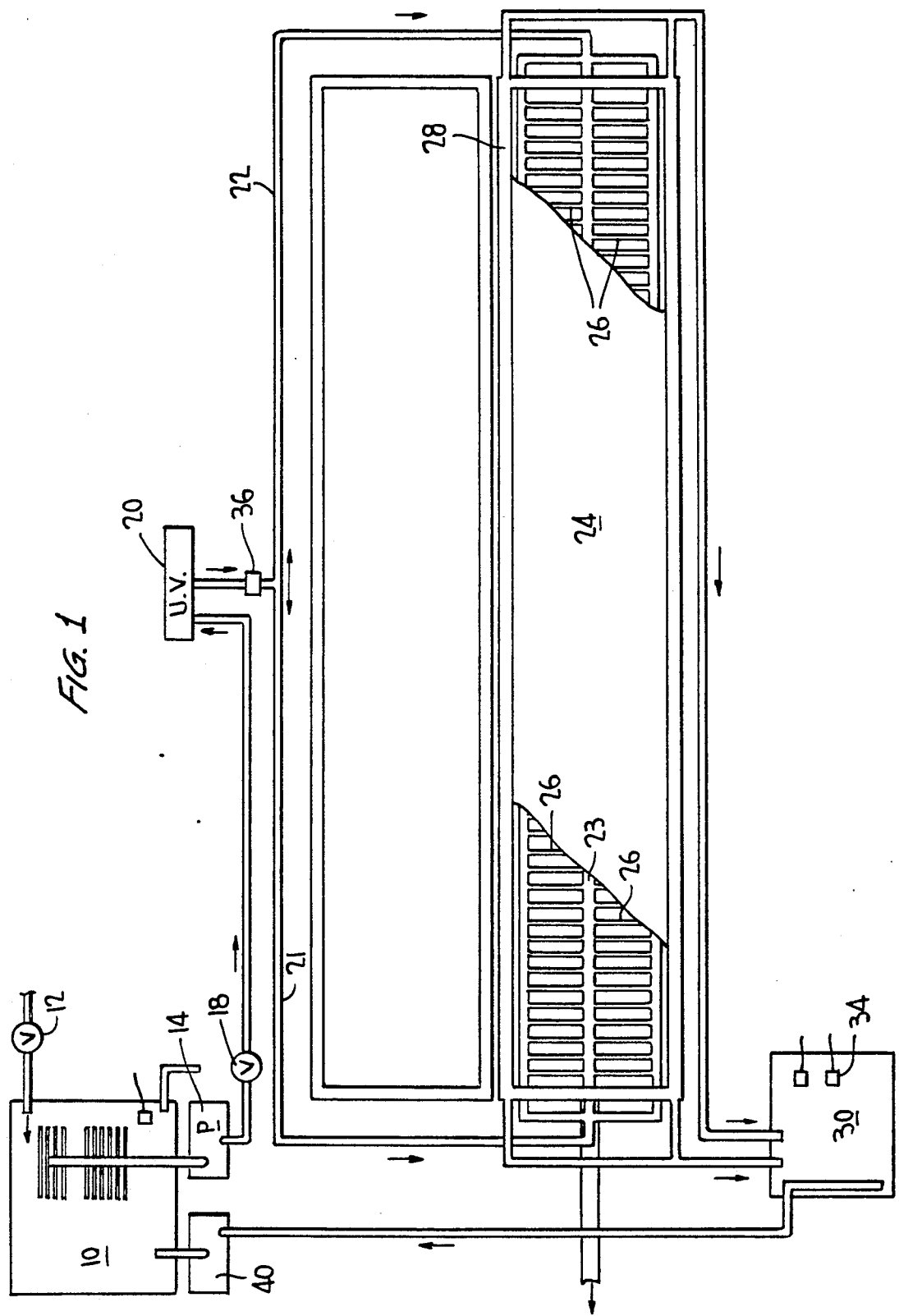
FIG. 1 is a combined schematic and plan view of a depuration tank, partly in section, and also diagrammatically showing the peripheral apparatus for operating the depuration process in accordance with the invention.

In accordance with the present invention, the seawater in the closed circulation system shown in FIG. 1 is started by introduction of the sea water into diatomaceous earth filter (DEF) tank 10 containing DEFs through valve 12 at approximately 150 gpm. The filtered sea water then exits tank 10 through pump 14, through valve 16, flow meter 18 and enters ultraviolet sterilizer 20 rated at 160 gpm for sea water. The sterilized sea water is then separated into two equal flow streams through respective pipes 21, 22 and introduced into opposite ends of depuration tank 24 through manifold 23 running the length of the bottom of depuration tank 24. The manifold 23 interconnects with a plurality of fill pipes 26 extending perpendicular from manifold 23 to each side of depuration tank 24. Each fill pipe 26 contains a plurality of holes producing a constant up-welling of water throughout the length and breadth of depuration tank 24 as is more fully described hereinafter. Inside depuration tank 24, the various and sundry pipes interconnecting the various components of the depuration system, the manifold pipe and the fill pipes are made of a material such as ceramic or gel coated plastic to prevent the introduction of contaminents or harmful materials into the depuration system.

The up-welled sea water overflows along both sides of depuration tank 24 into an overflow dam and recovery pipe 28 and is returned by gravity flow to make-up tank 30 containing a maximum level float switch and a minimum level float switch 34. The overflow dam and recovery pipe 28 extends around the entire upper periphery of depuration tank 24 as shown in FIG. 1, thereby recovering sea water from all areas of the depuration tank and preventing contaminated sea water from re-entering the depuration tank. The sea water exits make-up tank 30 and is re-introduced to DEF tank 10 to start the closed sea water cycle over again.

In an alternative embodiment of the invention, make-up tank 30 may be eliminated as enhanced control of the sea water flow rate throughout the depuration system will prevent loss of sea water from the system, such as by sea water spillage in the overflow dam and recovery trough 28.

A A-50, 5 hp. Dorr Oliver pump 40 pulls the sea water through DEF tank 10 and then pushes the filtered sea water through the remainder of the system at a rate of 150 gpm., which flow rate is determined by the size of the depuration tank 24 and the number of fill-pipes, the number of holes therein and the size of the holes, as is discussed more fully hereinafter. A safety flow switch 36 is positioned at the output of ultraviolet (uv) sterilizer 20, which safety switch closes the uv sterilizer 20 in the event of pump failure. A similar safety switch (not shown) shuts off pump 40 if one of the uv bulbs fails or if the radiation output drops below 20% of the uv sterilizer's radiation output capacity.

Figure 2:
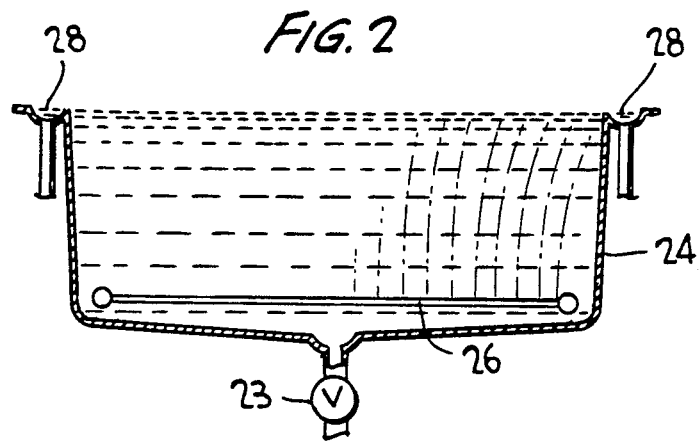
FIG. 2 is a cross-sectional view of the depuration tank showing the up-welling pattern of the sea-water, the recovery trough and overflow dam of the sea-water recovery system.

FIG. 2 is a cross-section through depuration tank 24 showing a portion of the up-welling pattern of the sea water emitted from the holes in a fill pipe 26. The sea water enters the fill pipe 26 through a manifold 23 (actual connection not shown). The sea water overflows from depuration tank 24 via the recovery trough 28, 28a. Because of the location and positioning of the manifold 23 and the fill pipes 26, as well as the size, number and location of the holes in both the manifold and the fill pipes, the up-welling sea water almost directly flows from the bottom of the depuration tank 24 to the side of the tank and into the recovery trough 28 or 28a, thereby carrying polluted water and undesirable chemical and other elements to the recovery trough. This is an important feature of the invention based on the rate of flow of the sea water into the depuration tank as well as the number and location of the holes in the fill pipes and manifold through which the sea water egresses into the depuration tank. An important function of these parameters is to provide a continuous, steady flow of sea water into and out of the depuration tank 24 to avoid dead sea water spots within the tank in which pollutants could collect.

The above-described embodiment provides a depuration system which optimizes the removal of pollutants and contaminants from the shell fish as well as the removal of such pollutants and contaminants from the depuration tank itself. In the case where oysters are being depurated, the above described embodiment and the parameters set forth therein afford an optimim rate of self-pumping of the oysters, thereby accelerating the depuration process. It is appraent that in the case of oysters, self-pumping will be hindered if the flow of sea water into the depuration tank is too slow or two fast. The flow rate of sea water should be such as to induce the oysters to self-pump.

Figure 3:
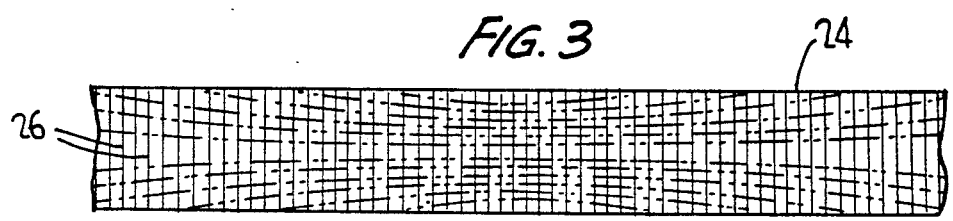
FIG. 3 is a detail of the tank showing the spacing of the fill pipes and the pattern of the up-welling produced from the holes in the fill pipes.

FIG. 3 illustrates the up-well pattern in the fill pipes 26 which are spaced one foot on center and in which the ⅛" holes are drilled with 12" on center spacing. In the manifold, ½" holes are drilled on 6" centers.

Figure 4A:
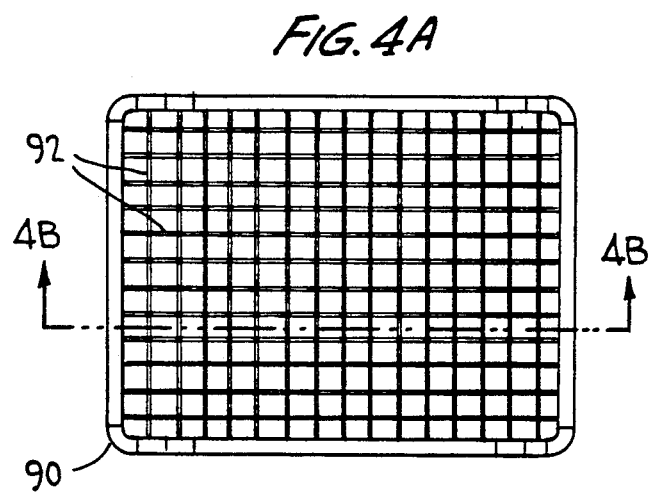
FIGS. 4A and 4B illustrate an exemplary embodiment of a structure for suspending shellfish (oysters) in the depuration tank.
Figure 4B:
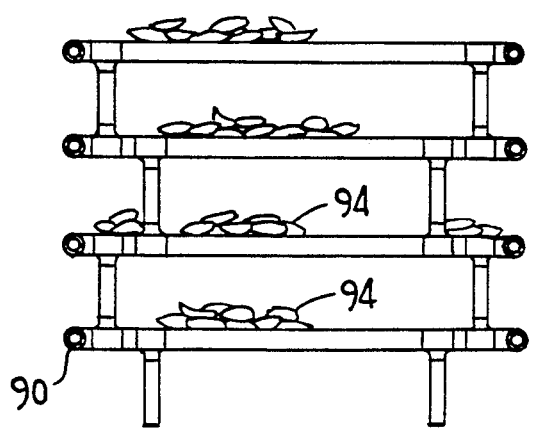

In a preferred embodiment of the depuration system in accordance with the invention, as shown in FIGS. 4A and 4B (FIG. 4A being a plan view and FIG. 4B being a section through lines A—A of FIG. 4A), the shellfish are suspended in the depuration tank by stacked structures 90 made of PVC pipe and polypropalene netting. Each support structure 90 is 8 feet long by 5 feet wide by 42 inches high and when the individual components are assembled in operating position within the depuration tank 24 (not shown), comprises four levels on which the shellfish are retained with a space of approximately 8 inches between the surface on which the shellfish 94 (as shown in FIG. 4B) lie and the adjacent surface or level holding more shellfish. The bottom of the structure is retained at a distance of approximately 6 inches from the manifold at the bottom of the tank.

Figure 5A:
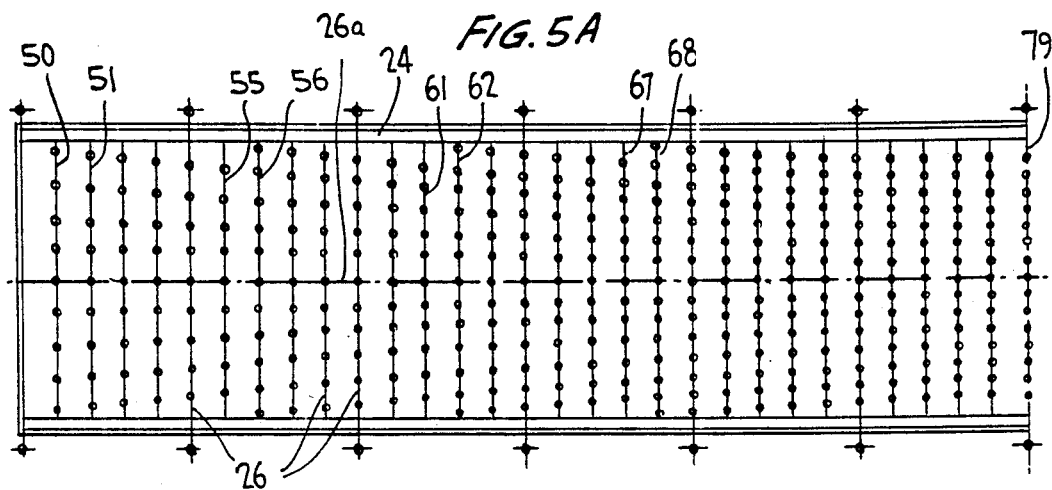
FIG. 5a and 5b respectively show a preferred embodiment of the depuration tank and the left half portion thereof in plan view showing the pattern of the holes in the fill pipes.

FIG. 5a illustrates a preferred embodiment of the general location, spacing and pattern of the holes in the manifold system of the depuration system in which the expression "manifold" is used to signify the hole pattern in the fill pipes 26 projecting from the manifold pipe 23 extending the length of the depuration tank. FIG. 5a shows the left half of the depuration tank, it being understood that the right half of the depuration tank is the mirror image of the left half. The holes drilled or otherwise formed in the fill pipes 26 are $\frac{1}{4}$" in diameter and generally form a parabolic pattern ($y^2 = ax^3$, where the x axis is taken along the longitudinal center axis of the depuration tank and y is the distance from the longitudinal center axis) as can be seen by following a row of holes beginning from the center line of the depuration tank to the right of FIG. 5a and continuing to the left toward the end of the depuration tank. The holes in the fill pipe 50, representing the first row of the fill pipes, are spaced at 12" intervals (all measurements are on center) and the holes in the fill pipes in row 79 are speced at six inch intervals. However, the remaining holes in the columns and rows are spaced at different intervals as will be explained with respect to FIGS. 6a and 6b. As shown in FIG. 5a, the holes in fill pipe 50 are spaced at 12" intervals from the center axis of the depuration tank. However, the holes in the fill pipe 79 at the center of the depuration tank, between the left and right halves thereof, are spaced at 6" intervals from the centerline thereof. Also as shown in FIG. 5a, the columns of fill pipes are spaced at 12" intervals along the longitudinal axis of the depuration tank. As can clearly be seen from FIG. 5a, the density of holes increases from the end of the depuration tank to the center of the tank as the spacing between the holes in the respective rows of the fill pipes decreases in that direction. The density increases in the aforesaid manner to make up for the decreasing sea water pressure as the sea water is introduced from each end of the depuration tank toward the center of the tank.

Figure 5B:
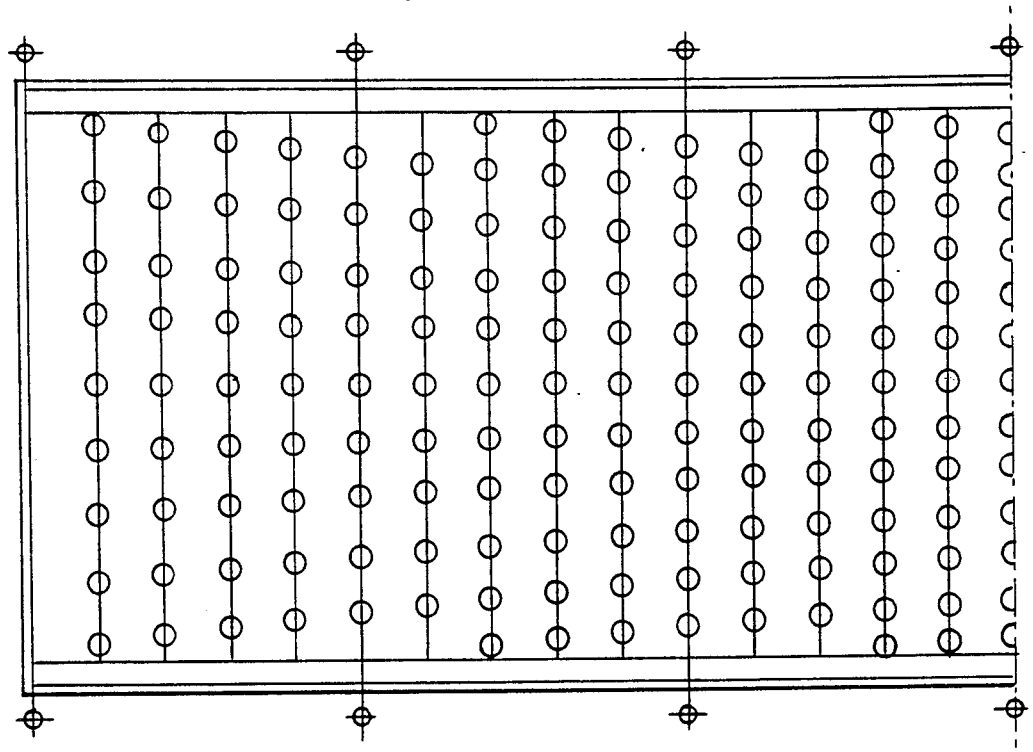

It is also believed to be evident from a consideration of FIGS. 5a and 5b that the holes in any given row of holes in the fill pipes are substantially parabolically shaped. It is further evident that the number of holes in any given vertical column of holes are equal in number above and below the center axis of the depuration tank and are symmetrically placed with respect to the center axis. With particular reference to FIG. 5a, beginning with fill pipe 50 and continuing to the sixth fill pipe 55, there are nine (9) holes in each fill pipe or column of holes. Beginning with fill pipe 56 and continuing to fill pipe 61 there are eleven (11) holes in a column. Beginning with fill pipe 62 and continuing to fill pipe 67 there are thirteen (13) holes in a column. Beginning with fill pipe 68 and continuing to the centerline of the depuration tank as represented by fill pipe 79, there are fifteen (15) holes per column. However, the spacing of the holes about the longitudinal centerline of the depuration tank is different for each vertical colum of holes as is more fully explained hereinafter with respect to FIGS. 6a and 6b.

FIG. 6a illustrates a $\frac{1}{4}$ quadrant of the depuration tank, for example the lower left quadrant with vertical columns 0 through 29 beginning at centerline 79 to fill pipe 50 at the end of the depuration tank. The holes in each vertical column are designated 1 through 7 with zero representing the longitudinal centerline 80 of the depuration tank. FIG. 6a shows the distances of each hole in a column as measured from the longitudinal centerline 80. It is understood that the upper quadrant (not shown) of the depuration tank is the mirror image of the lower quadrant of the depuration tank shown in FIGS. 6a and 6b. Furthermore, the symmetry of the hole pattern is similar for the other half of the depuration tank.

With a sea water flow rate of approximately 150 gpm, the dimensions of the pipe, the manifold and fill pipe dimensions, as well as the size of the holes and the number and spacing of the holes as described herein, the depuration system produces optimum results as measured by the pollutants removed from the shell fish (oysters) and the removal of the pollutants from the sea water which is conveyed to the drainage gutters around the periphery of the depuration tank without the existence of dead spots in the depuration tank. As has been previously stated, in the case where oysters are being depurated, it is necessary to provide an optimum turbulence in the depuration tank that may be defined as that turbulence that will induce the oysters to self pump and thereby assist in the removal of pollutants from their bodies. Unfortunately, there is no formula among the variables involved from which the optimum turbulence can be obtained. Essentially a trial and error procedure is required, which involves varying the sea water pressure, the location and size of the holes in the fill pipes and the number of holes and their relative density in the depuration tank.

METHODS FOR SAMPLING AND BACTERIAL ANALYSIS; METHODOLOGY FOR BACTERIAL ANALYSIS

There are essentially two distinct groups of bacteria that are enumerated. The first group are those associated with the fecal coliforms or sewage and runoff pollution and thos bacteria which reside in the marine environment as part of the natural micobial population, regardless of the general pollution or point source pollution.

The classical indicator organism in the coliform found in marine estuaries have been regarded as a sign of pollution from human or animal sources and therefore, are of public health significance since other pathogenic bacteria or viruses occurring in sewage may accompany the coliforms for which tests are presently performed. Though enteric pathogens are considered a threat to public health, the second group consisting of the aprophytic Vibrios may be of greater public health significance, even though their presence cannot be attributed to pollution from sewage. Vibrio vulnificus has been implicated in serious illnesses and death due to ingestion of raw oysters from the Gulf Coast and has been directly linked to serious infections from cuts and abrasions on the feet and legs of humans originating from the Chesepeake Bay area waters.

Bacteriological analyses and enumeration, both in seawater and shellfish meats, for the coliform group will be the Most Probable Number Total Coliform and Fecal coliform and the Membrane Filtration Method as described in *Standard Methods for the Examination of Water and Wastewater*, 16th Edition. The Most Probable Number is known to have large variances in some cases; therefore, the Membrane Filtration Method will also be used because it is more accurate when the MPN is questionable (large variances).

The enumeration of Vibrio parahaemolyticus uses two approaches. The first method is a direct plating approach using TCBS agar [Difco Manual, 10th Edition; T. Kaneko and R. R. >Colwell, 1978]. The second method at low concentrations (MPN) uses enriched seaweed yeast extract medium and confirms positives using TCBS agar.

The approach for the enumeration of Vibrio vulnificus uses Cellobiose—Polymyxin—B—Colistin Agar as described by Massad, G. and J. D. Oliver, 1978.

SAMPLING PROCEDURE

Samples of shellfish (for the purposes of the description, oysters) are to be taken from the depuration tank at times of 0, 12 hours, 24 hours, 36 hours, 48 hours and 60 hours from within the two structures holding the oysters. Three oysters from each level (total of three levels) from each structure (2 structures per tank) are taken randomly at each time frame (6 time frames). A sample of the seawater that is being processed in the system will also be taken from the tank at each of the time frames. The 18 oysters sampled from both structures from each time frame will be processed as one sample. Should purification or depuration after 48 hours not meet the levels established in *The National Shellfish Sanitation Program, Manual of Operations*, separate samples at different levels from each structure will be taken and analyzed.

It is apparent that modifications and changes can be made to the above-described method and apparatus without departing from the invention, the scope of which is to be determined by the following claims and the equivalents that each of the elements of the claims are entitled.

What is claimed is:

1. A tank for the depuration of shellfish, comprising:
   an elongated open vessel for retaining sea water;
   a manifold extending the length of the bottom of said vessel substantially along the longitudinal center axis from one end of the vessel to the other and including a connection at each end thereof for the injection of sea water;
   a plurality of fill pipes extending from said manifold toward each side of said vessel and each fill pipe including a pattern of holes for the emission of sea water therefrom forming an up-welling pattern to provide a desired turbulence within said vessel; and
   a trough extending around the upper periphery of said vessel for recovering sea water spilling over the upper walls of said vessel, the injection of sea water through said holes and the recovery of sea water in said troughs preventing dead spots within the sea water in said vessel.

2. A tank as claimed in claim 1, wherein the density of said holes increases from both ends of said vessel to the center thereof to provide an even distribution of sea water within said vessel.

3. A tank as claimed in claim 1, wherein said holes form a pattern of rows extending from the center of said tank toward each end, each row having a parabolic shape with the center of said tank forming the y axis and the x axis of each row being defined by an axis including a particular hole in a particular row and extending parallel to said longitudinal center axis.

4. A tank as claimed in claim 1, wherein each of said fill pipes is separated from an adjacent fill pipe by a 12" center-on-center spacing, the holes in the fill pipe adjacent an end of said vessel are spaced 12" on center from one another, the holes in the fill pipe at the center of said vessel are separated 6" center-on-center and the diameter of the holes is '/8" and the diameter of the fill pipes is 1".

5. A tank as claimed in claim 1, wherein said vessel is 60' long, 9'6" wide and 42" deep.

6. A tank as claimed in claim 1, wherein said vessel, manifold, recovery trough and fill pipes are made of a non-corrosive material.

7. A tank as claimed in claim 6, wherein said vessel is made of Fiberglas and said manifold, fill pipes and recovery trough are made of PVC.

8. A tank as claimed in claim 1, further comprising support means for suspending shellfish within said tank within said up-welling pattern.

9. Apparatus for the depuration of shellfish, comprising:
   at least one depuration tank including a manifold extending along the bottom length of said tank for distributing sea water and a plurality of fill pipes extending from both sides of said manifold toward each side of said tank and each including a plurality of holes for emitting sea water into said tank to provide an up-welling pattern precluding the formation of dead sea water spots within said tank, said tank further including a recovery trough extending around the upper periphery of said tank for collecting sea water tending to overflow from said tank;
   support means for suspending shellfish within said tank within said up-welling pattern;
   means for filtering sea water;
   means for pumping sea water within said apparatus; and
   means for delivering sea water from said recovery trough to said pumping means.

10. Apparatus for the depuration of shellfish as set forth in claim 9, wherein said filter means includes a a diamotaceous earth filter for receiving and filtering sea water and an ultraviolet filter connected to the output of said filter tank and providing a filtered sea water output to said manifold.

11. Apparatus as claimed in claim 9, further comprising a make-up tank receiving sea water collected from said tank and providing sea water to said filter tank.

12. Apparatus as claimed in claim 9, wherein said means for pumping provides a flow of sea water of 150 gpm.

13. Apparatus as claimed in claim 9, wherein said fill pipes are located approximately 1 foot on center from one another and the plurality of holes in said fill pipes are approximately ⅛" in diameter and are spaced approximately 12" on center from one another, the density of holes increasing from each end of said depuration tank toward the center thereof.

14. Apparatus as claimed in claim 9, wherein each of said at least one depuration tank is approximately 60' long, 9'-6" wide and 42" high.

15. A method for the depuration of shellfish, comprising the steps of:
   emitting sea water from a manifold extending along the longitudinal axis within at least one depuration tank through a plurality of fill pipes extending perpendicular from said manifold towards each side of said at least one depuration tank, thereby creating an up-welling pattern of sea water having substantially no dead spots;
   recovering up-welled sea water from the periphery of said depuration tank;

supporting said shellfish within said up-welling pattern of sea water;
filtering said sea water; and
pumping sea water through said manifold and said fill pipes.

16. A method as claimed in claim 15, further comprising the steps of:

exposing said sea water to ultraviolet light and providing a filtered sea water output to said manifold;
returning the recovered sea water overflowing from said at least one depuration tank for filtering.

17. A method according to claim 15, wherein said step of pumping sea water provides a flow rate of substantially 150 gpm.

* * * * *